H. S. PEED.
EXTERNAL CONTRACTING BRAKE FOR AUTOMOBILES.
APPLICATION FILED JUNE 17, 1921.
1,434,022.  Patented Oct. 31, 1922.
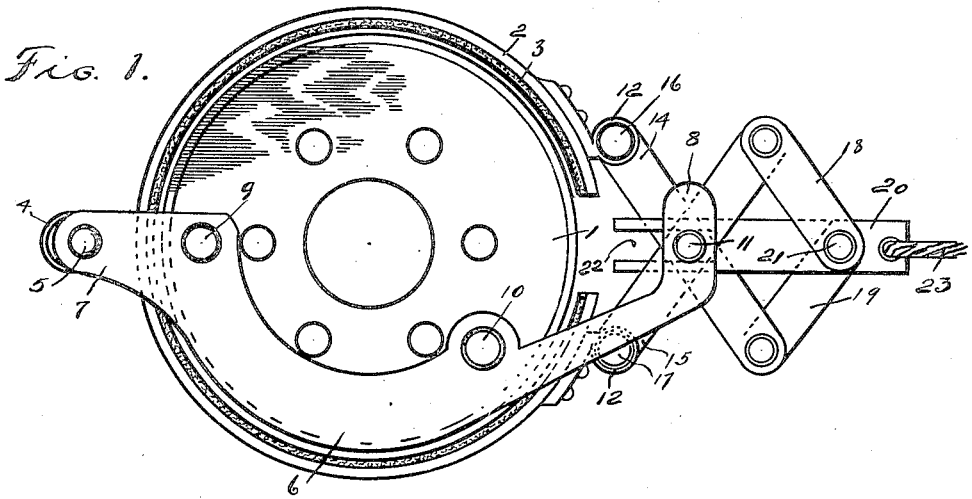
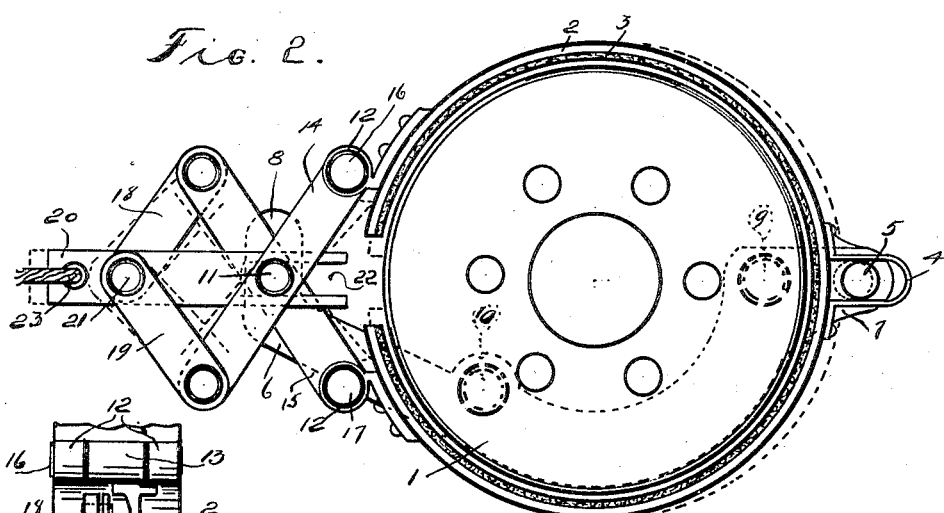
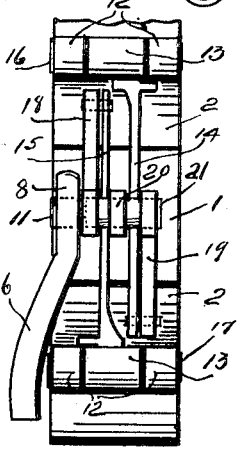
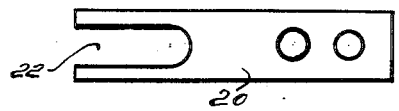
INVENTOR
Horace Seymour Peed
BY
M. C. Gillham.
ATTORNEY Patented Oct. 31, 1922.

1,434,022

UNITED STATES PATENT OFFICE.

HORACE SEYMOUR PEED, OF KANSAS CITY, MISSOURI.

EXTERNAL CONTRACTING BRAKE FOR AUTOMOBILES.

Application filed June 17, 1921. Serial No. 478,411.

*To all whom it may concern:*

Be it known that I, HORACE SEYMOUR PEED, a citizen of the United States, residing at Kansas City, in the county of Jackson and State of Missouri, have invented a new and useful External Contracting Brake for Automobiles, of which the following is a specification.

My invention relates to external contracting brakes for automobiles, and the object of the invention is to provide a quick acting and self adjusting device of this character which may be applied to automobiles.

I attain these objects and other advantages by means of the mechanism and association of parts illustrated in the accompanying drawing in which—Figure 1, is a rear elevation of a brake drum to which my invention is applied; Figure 2, is a front elevation of the same; Figure 3, is an edgewise view of the same and, Figure 4, is a plan view of the plunger rod for operating the brake, a part of my invention.

Similar reference numerals refer to corresponding parts throughout the several views.

The brake drum 1, is fairly representative of the usual brake drum device and which may be used for expanding or external contracting brake devices. The device comprising my invention comprises a metallic band 2, which is severed and adapted for loosely surrounding the periphery of the brake drum, on the inner side of the band is a liner 3, which is made of any suitable material or substance, preferably, the commercial brake lining. The band 2, is preferably made of spring steel adapted for tensioning. The terminals of the band are spaced apart a suitable distance, so that the band may be contracted and drawn to impinge upon the brake drum, by forcing the terminals mentioned toward each other. On the outer side of the band and located directly opposite to the spaced opening between the terminals thereof, is rigidly mounted an elongated slide bearing 4, which is adapted for receiving, slidably, a stud 5, integral with the attaching member 6, said attaching member is fashioned in contour to substantially conform with the circular band. The outer end portion of the attaching member is extended outwardly to form an extension 7, and on the inner side of the extension the stud 5, is located, and at the inner end of the attaching member is a vertical extending portion 8. Holes are provided in the attaching member for receiving the customary brake shoe bolt 9, and also the radius rod bolt 10, whereby the member is held on the brake drum. In the vertical portion 8, is a stud 11, and which is fashioned for a pivot, the stud being located in a horizontal plane with the stud 5. On the outer sides of the end portions of the band are rigidly mounted registering pin bearings 12, which bearings are arranged respectively to receive pin bearings 13, on levers 14 and 15, and are held in place by virtue of pivot pins 16 and 17, in which environment the levers are permitted to turn. Intermediate of the levers 14 and 15, are pivot holes which are adapted for loosely receiving the stud or pivot 11, the levers are crossed upon each other in the manner of scissors and then mounted on the stud 11. The outer end portions of the crossed levers 14 and 15, are provided with pivot holes and toggle links 18 and 19, are pivotally connected between the outer ends of the crossed levers 14 and 15, the toggle formed by the toggle links 18 and 19, being arranged to flex outwardly. A plunger plate 20, is pivotally mounted on the pivot pin 21, which connects the toggle links 18 and 19, and is extended between the toggle links and between the crossed levers 14 and 15, the inner end of the plunger is provided with a longitudinally extending slotted recess 22, which is adapted for slidably receiving the stud 11, whereby the plunger is held in horizontal alignment and accurately guides the toggle. On the outer end of the plunger is connected a cable 23, which is connected with the foot brake pedal of an automobile, not shown.

The brake band 2, is mounted on the attaching member 6, by placing the slide bearing 4, on the stud 5, and placing the crossed levers 14 and 15, on the stud 11, with the plunger 20, imposed between the levers and also imposed between the inner ends of the toggle links 18 and 19, the recess 22, receiving the stud 11, and the hole in the outer end of the plunger receiving the pivot 21. The assembly of parts mentioned is then attached on the brake drum 1, by entering the brake shoe bolt 9, and the radius rod bolt 10, through the attaching member. When thus attached on the drum, the brake band 2, will be spaced a little distance from the periphery of the brake drum, excepting the portion thereof at the slide bearing 4, which portion will bear on the brake drum very lightly when the brake band is in normal position. When a brake application is made, the cable 23, draws the plunger 20, outwardly of the brake drum, and the plunger in turn draws the toggle outwardly, thereby the plunger and the toggle turn the outer ends of the levers 14 and 15, inwardly to approach each other, and the levers mentioned turning on the pivot 11, effect an inward movement of the inner ends of the crossed levers, which ends of the levers being attached on the opposite terminal portions of the brake band, force the band to contract to bear on the periphery of the brake drum, at the inner half of the brake drum and, at the outer half of the brake drum, to move the brake band from the drum, as is shown by dotted line in Figure 2, the slide bearing 4, sliding on the stud 5, in outward direction a corresponding distance. When the brake application is released the brake band 2, reacts with sufficient force to return the crossed levers to normal position and self adjust itself on the slide bearing 4, to bring the brake band back to normal position relative to the brake drum.

The slide bearing 4, on the brake band and the slide bearing 22, in the plunger 20, cooperate to preserve the integrity of the spacing of the brake band from the brake drum, whereby quick action of the brake applications may be depended upon. The self adjusting of the parts is a provision for quick dependable action and caring for the waste incidental to the wearing of the brake lining.

Having described my invention what I claim is—

In an external contracting brake for automobiles, the combination with the brake drum, of an attaching member mounted on the side of the brake drum and having oppositely disposed horizontally aligned inwardly projecting studs, a severed spring metal brake band slidably arranged on said attaching member and held normally spaced from the brake drum, the terminal ends of said brake band being spaced apart to permit contracting of the brake band to bear on the brake drum, crossed levers pivotally mounted on said attaching member and having their inner ends pivoting on opposite ends of said brake band, a toggle pivotally connected between the outer ends of said crossed levers, a draw bar pivoting on said toggle and slidably mounted on the pivot supporting said crossed levers, and means for pulling said draw bar to draw said toggle and thereby turn said crossed levers to contract said brake band on said brake drum.

Kansas City, Mo. June 14th, 1921.

HORACE SEYMOUR PEED.

Witnesses:
J. E. HOFFMAN,
GOODWIN CREOSON.